US008608616B2

(12) United States Patent
Nissato

(10) Patent No.: US 8,608,616 B2
(45) Date of Patent: Dec. 17, 2013

(54) CLUTCH CONTROL DEVICE OF HYBRID VEHICLE

(71) Applicant: Mitsubishi Jidosha Kogyo Kabushiki Kaisha, Tokyo (JP)

(72) Inventor: Yukihiro Nissato, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/712,559

(22) Filed: Dec. 12, 2012

(65) Prior Publication Data
US 2013/0150206 A1   Jun. 13, 2013

(30) Foreign Application Priority Data

Dec. 13, 2011 (JP) ................................. 2011-272804

(51) Int. Cl.
*B60W 10/02* (2006.01)
(52) U.S. Cl.
USPC ................ 477/5; 701/22; 701/67; 180/65.21; 180/65.275
(58) Field of Classification Search
USPC ............ 477/5; 701/22, 67; 180/65.21, 65.275
See application file for complete search history.

(56) References Cited

U.S. PATENT DOCUMENTS

| 6,810,669 | B2 * | 11/2004 | Tanaka et al. | .................... | 60/711 |
| 8,412,428 | B2 * | 4/2013 | Ellis | ................................ | 701/67 |
| 2008/0096717 | A1 * | 4/2008 | Houle et al. | ...................... | 477/5 |
| 2011/0295476 | A1 | 12/2011 | Ellis | | |
| 2012/0089285 | A1 * | 4/2012 | Nissato | ........................... | 701/22 |

FOREIGN PATENT DOCUMENTS

| EP | 1762452 A2 | 3/2007 |
| JP | 2010-281397 A | 12/2010 |
| WO | WO 2011/079740 A1 | 7/2011 |

* cited by examiner

*Primary Examiner* — Derek D Knight
(74) *Attorney, Agent, or Firm* — Birch, Stewart, Kolasch & Birch, LLP

(57) ABSTRACT

A clutch control of a hybrid vehicle can engage a clutch which not otherwise possible due to temporary factors, and can determine whether engaging members of the clutch have been successfully engaged. The clutch control controls the clutch having a pair of the engaging members which are provided in a power transmission path of the vehicle, and which are moved in the axial direction and engaged or released when switching is performed between power from a motor and power from an engine. The clutch control device has a rotation control unit for synchronizing the rotations of the engaging members when the clutch is shifted from a disengaged an engaged state, and a clutch engagement control unit for determining whether the engaging members have been engaged, based on rotational speed of the engaging members a predetermined time after axial movement of the engaging members.

5 Claims, 7 Drawing Sheets

US 8,608,616 B2

CLUTCH CONTROL DEVICE OF HYBRID VEHICLE

The entire disclosure of Japanese Patent Application No. 2011-272804 filed Dec. 13, 2011 is expressly incorporated by reference herein.

TECHNICAL FIELD

This invention relates to a clutch control device of a hybrid vehicle.

BACKGROUND

In recent years, hybrid vehicles, which are allowed to run by a combination of the driving force of a motor and the driving force of an engine, have been developed, and put to increased practical use. Among the hybrid vehicles are, for example, those adopting the series method in which the vehicle is run by the driving force of the motor, and the engine is used as a power source for an electric generator, and those relying on the parallel method in which the vehicle is run by the driving forces of both of the engine and the motor (or the driving force of the engine alone). Alternatively, there are those which switch among the following travel modes according to the operating situation of the vehicle: an EV travel mode in which the vehicle is run by the driving force of the motor alone; a series travel mode in which the above series method is applied; and a parallel travel mode in which the above parallel method is applied.

In switching among these travel modes, a clutch provided in a power transmission mechanism is disengaged or engaged to switch among the paths of power transmission. That is, the motor is connected to driving wheels, and the engine is connected to the driving wheels via the clutch. In the EV travel mode and the series travel mode, the clutch remains disengaged, and only power from the motor is transmitted to the driving wheels. In the parallel travel mode, the clutch is in an engaged state, and the power of the engine and the power of the motor are transmitted to the driving wheels.

As a clutch control device for controlling the clutch in the above manner, the one described in Patent Document 1, for example, is known. The clutch control device described in Patent Document 1 is a clutch control device for controlling a clutch, the clutch comprising a pair of engaging members provided in a power transmission path of a vehicle and relatively moving in an axial direction to engage with or disengage from each other; and a driving means for exerting a driving force on at least one of the pair of engaging members to direct it toward the other engaging member, according to a command value inputted to the driving means, wherein the clutch control device exercises engagement control for inputting into the driving means a predetermined command value preset as a command value which brings the pair of engaging members into a completely engaged state and, if the pair of engaging members are not judged to be in the completely engaged state after the predetermined command value has been inputted to the driving means in the engagement control, the clutch control device changes the command value to a value corresponding to a greater driving force than a driving force corresponding to the predetermined command value. That is, with this clutch control device, when the engaging members of the clutch are judged not to have been engaged in the clutch engagement attempts even in the presence of a temporary inclination or snagging, control is exercised so as to increase the driving force exerted on the engaging members, thereby engaging the clutch.

PRIOR ART DOCUMENTS

Patent Documents

[Patent Document 1] JP-A-2010-281397

SUMMARY OF THE INVENTION

Problems to be Solved by the Invention

Generally, with a hydraulic clutch, whether the engaging members are engaged or not is determined by detecting with a pressure sensor whether or not a pressure on the engaging members of the clutch is constant. However, the pressure sensor poses difficulty in accurately measuring the pressure, and has the possibility of erroneously recognizing whether the clutch is engaged or disengaged.

When a hydraulic clutch is used as the clutch, moreover, the clutch may be minimally engaged in a state where the oil temperature of the clutch is low, such as under low temperature conditions. Thus, a clutch-nonengageable status due to a temporary factor may be present. In such a case, the clutch can be engaged, but it is determined that its engagement is impossible. As a result, there is a possibility that the clutch cannot be engaged. Particularly, a vehicle, in which the travel mode can be switched from the series travel mode to the parallel travel mode as stated earlier, has many opportunities to carry out the engagement of the clutch. If a determination of whether the clutch is engaged or disengaged cannot be made correctly in such a vehicle, the vehicle cannot run in a proper travel mode, although the clutch is engageable.

Under these circumstances, the present invention aims at solving the problems of the conventional technologies mentioned above. It is an object of this invention to provide a clutch control device of a hybrid vehicle which can engage a clutch in the case of the inability to engage the clutch due to a temporary factor, such as difficulty in engaging the clutch in a state where the oil temperature of the clutch is low, for example, under low temperature conditions; and which can make a simplified and accurate determination of whether the engaging members of the clutch have been successfully engaged or not.

Means for Solving the Problems

The clutch control device of a hybrid vehicle according to the present invention is a clutch control device for exercising disengagement and engagement control of a clutch in a hybrid vehicle, the hybrid vehicle having formed therein a driving force transmission path for transmitting a driving force from an engine to driving wheels via the clutch, and a rotating force transmission path in which an electric motor is connected between the clutch and the driving wheels to transmit a rotating force of the electric motor to the driving wheels, wherein the clutch comprises a first clutch plate to which the driving force from the engine is inputted, and a second clutch plate engaging the first clutch plate to form the driving force transmission path, the second clutch plate is configured to be synchronized with rotation of the electric motor, and the clutch control device has determination means which determines that engagement of the clutch has been accomplished, on condition that a difference between rotational numbers of the first clutch plate and the second clutch plate at a predetermined engaging time after start of the engagement of the clutch is equal to or smaller than a predetermined value, when the clutch control device performs the disengagement and engagement control of the clutch so as to switch from a first travel mode, in which the vehicle runs by use of the rotating force transmission path alone, to a second travel mode using the driving force transmission path. Because of these features, it can be determined easily and accurately whether the clutch has been engaged or not. Since the clutch engagement takes place at the predetermined engaging time, moreover, the clutch can be engaged in the case of a clutch engagement failure due to a temporary factor, such as difficulty of clutch engagement at a low oil temperature of the clutch, for example, under low temperature conditions.

A preferred embodiment of the present invention is that when the clutch control device determines that the engagement of the clutch has not been accomplished, the clutch control device starts engagement of the clutch repeatedly, and corrects the predetermined engaging time according to count of how many times it has been determined that the engagement of the clutch was not accomplished, or according to an oil temperature of the clutch.

Preferably, the higher the count of how many times it has been determined that the engagement of the clutch was not accomplished, the longer the predetermined engaging time becomes. It is also preferred that the higher the oil temperature of clutch, the longer the predetermined engaging time becomes. When it has been determined that engagement failed, the predetermined engaging time is lengthened, because the clutch having more difficulty reaching an engaged state. By so doing, the clutch can be made easier to engage in a state where the oil temperature of the clutch is low, for example, under low temperature conditions.

It is preferred for the clutch control device to take, as the predetermined engaging time, a first time set based on the count of how many times it has been determined that the engagement of the clutch was not accomplished, or a second time set based on the oil temperature of the clutch, whichever is longer. Because of this feature, the predetermined engaging time can be set more appropriately depending on the state of the clutch.

Effects of the Invention

According to the clutch control device of a hybrid vehicle concerned with the present invention, the following superior effects can be exhibited: The clutch control device can engage a clutch in the case of a failure in clutch engagement due to a temporary factor, such as difficulty in engaging the clutch in a state where the oil temperature of the clutch is low, for example, under low temperature conditions; and can determine easily and accurately whether or not the engaging members of the clutch have been successfully engaged.

MODE FOR CARRYING OUT THE INVENTION

Embodiment 1

A first embodiment of the present invention will now be described with reference to FIGS. 1 to 6.

Figure 1:
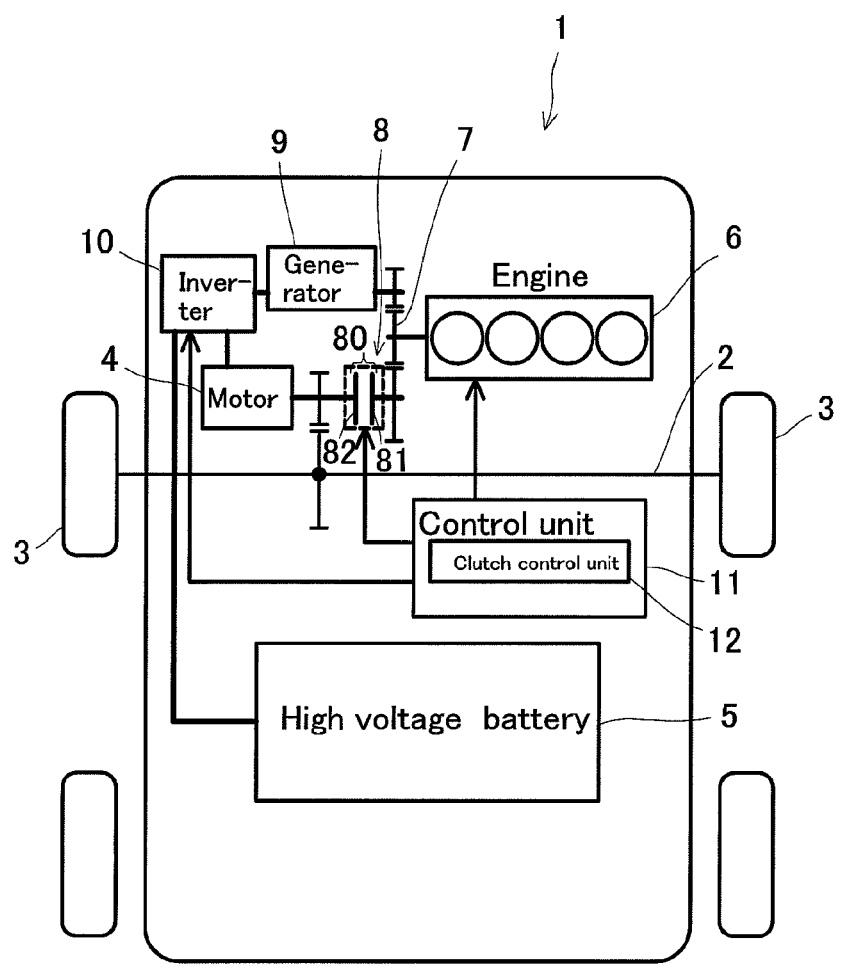
FIG. 1 is a schematic view of a vehicle according to Embodiment 1.

A vehicle 1 shown in FIG. 1 is a hybrid vehicle. As shown in FIG. 1, the vehicle 1 is loaded with a motor 4 as an electric motor for transmitting a driving force to wheels 3 via a power transmission mechanism 2. The vehicle 1 is also loaded with a high voltage battery 5 for supplying electric power to the motor 4, and the high voltage battery 5 can be charged with electricity from the outside.

An engine 6 as an internal combustion engine is installed in the vehicle 1, and an output system 7 of the engine 6 is connected to the power transmission mechanism 2 via a clutch 8. Engaging members 80 constituting the clutch 8 are composed of a first clutch plate (first engaging member) 81 located on the side of the engine 6, and a second clutch plate (second engaging member) 82 located on the side of the motor 4. A driving force from the engine 6 is transmitted to the wheels 3 via the clutch 8 and the power transmission mechanism 2. The transmission path of this driving force is designated as a driving force transmission path. When a generator 9 is actuated by the driving of the engine 6, electric power generated by the generator 9 is supplied, as appropriate, to the motor 4 and the high voltage battery 5 via an inverter 10.

The above-mentioned vehicle 1, under normal conditions, is in a state where the clutch 8 is disengaged. In this state, no power is transmitted between the output system 7 and the power transmission mechanism 2, and the vehicle 1 runs upon the driving of the motor 4. That is, under the normal conditions, the vehicle 1 selects a travel mode which is a first travel mode (an EV travel mode and a series travel mode). Here, a path for transmitting a rotating force by the motor 4 in the first travel mode to the power transmission mechanism 2 is designated as a rotating force transmission path. When a necessary driving output is not obtained any more by the driving force of the motor 4 in a high speed travel or the like, the clutch 8 is engaged, whereby the driving force of the engine 6 is transmitted to the power transmission mechanism 2, with the result that the driving force of the engine 6 is added (or the driving force of the engine 6 alone is used) and, in this state, the vehicle 1 runs. That is, in this case, the vehicle 1 selects a travel mode which is a second travel mode (parallel travel mode).

The vehicle 1 is equipped with a control unit 11. The control unit 11 exercises the integrated control of the vehicle. The control unit 11 has a clutch control unit 12 as a clutch control device for switching the state of the clutch 8 as stated above. The clutch control unit 12 performs clutch control for engaging the clutch 8 when it is necessary to switch the vehicle to the parallel travel mode (second travel mode) while the vehicle is running in the series travel mode or the EV travel mode (first travel mode).

Figure 2:
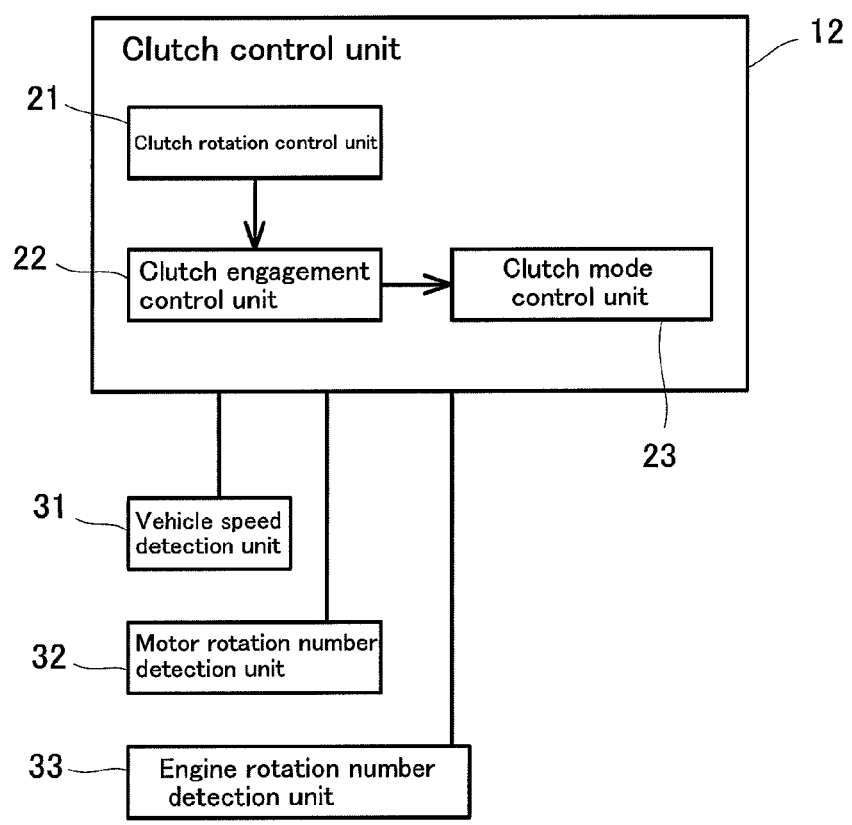
FIG. 2 is a block diagram of a control unit according to Embodiment 1.

As shown in FIG. 2, the clutch control unit 12 is equipped with a clutch rotation control unit 21, a clutch engagement control unit 22, and a clutch mode control unit 23. The vehicle 1 is also equipped with a vehicle speed detection unit 31, a motor rotational number detection unit 32, and an engine rotational number detection unit 33 which are used in the clutch control by the clutch control unit 12. The respective detection units detect the vehicle speed, the motor rotational number, and the engine rotational number, respectively, based on the results of detection by relevant sensors. Each detection unit will be described in detail below.

The clutch control unit 12 actuates the clutch rotation control unit 21 in the absence of a clutch engagement prohibition mode which will be described in detail later. The clutch rotation control unit 21 exercises control so as to match the rotational number of the first engaging member on the engine side to the rotational number of the second engaging member on the motor side, when the vehicle speed obtained from the vehicle speed detection unit 31 becomes a predetermined value or more (when the travel mode switches from the series travel mode (or the EV travel mode) to the parallel travel mode). Then, it is determined, based on the rotational numbers obtained from the motor rotational number detection unit 32 and the engine rotational number detection unit 33, whether the rotation of the first engaging member and the rotation of the second engaging member have been synchronized to each other. Synchronization between the rotational numbers is performed by the generator driving the engine in such a manner that the rotational number of the first engaging member on the engine side equals (or nearly equals) the rotational number of the second engaging member on the motor side. When the rotational numbers of the first engaging member and the second engaging member is synchroned, the clutch rotation control unit 21 inputs a clutch engagement instruction signal to the clutch engagement control unit 22.

When the clutch engagement instruction signal is inputted upon synchronization of the rotations of the first engaging member and the second engaging member, the clutch engagement control unit 22 drives a clutch solenoid valve to raise the clutch oil pressure, moving the engaging members in the axial direction. The clutch engagement control unit 22 determines whether or not engagement has been successfully carried out, based on whether the difference between the rotational numbers of the first engaging member and the second engaging member is within a predetermined value when a preset estimated time has elapsed since the start of movement of the engaging members. That is, if the rotational number difference after a lapse of the estimated time is within the predetermined value, it is determined that engagement has been successful. If the rotational number difference after a lapse of the estimated time is larger than the predetermined value, it is determined that the first engaging member and the second engaging member have failed to be engaged with each other.

Concretely, once the power source is switched to the engine, the engagement of the engaging members is accomplished, and the first engaging member and the second engaging member are in a completely directly connected state. Thus, no difference occurs between the rotational numbers of the first engaging member and the second engaging member. On the other hand, if the engaging members are out of engagement (in the state of a partial clutch engagement) when the power source is switched to the engine, a slip occurs in the rotation on the engine side, and the rotational number increases. As a result, a difference arises between the rotational numbers of the first engaging member and the second engaging member. These rotational numbers are acquired from the motor rotational number detection unit and the engine rotational number detection unit.

The estimated time is acquired by the clutch engagement control unit 22 from a map or table prestored in the clutch engagement control unit 22. The map or table shows the relationship between the estimated time and a clutch-nonengageable determination count to be described later. In the map or table, the larger the clutch-nonengageable determination count, the longer the estimated time becomes.

When the clutch engagement control unit 22 determines that the engaging members have been successfully coupled (engaged), it retains the engagement of the clutch, so that the vehicle is switched to the parallel travel mode and continues to run. When the clutch engagement control unit 22 determines that the engaging members 80 have failed to be coupled (engaged), the clutch engagement control unit 22 terminates the engagement control of the clutch, releasing the engaging members. That is, the vehicle cannot be switched to the parallel travel mode, and runs in the series travel mode (or the EV travel mode).

When the clutch mode control unit 23 decides that the clutch engagement control unit 22 has failed in engaging the engaging members 80, the clutch mode control unit 23 sets a determination flag, and counts up the clutch-nonengageable determination count. That is, the clutch-nonengageable determination count is increased from N to N+1. During the setting of the flag, the clutch mode control unit 23 continues to feed out the clutch engagement prohibition mode to the clutch control unit 12 until the vehicle stops. This is because a sufficient time is provided by the time the viscosity of the clutch oil recovers, since continuous retries during travel of the vehicle have the possibility that engagement will fail again. During the clutch engagement prohibition mode, the clutch control unit 12 does not perform clutch engagement, as already mentioned, even if in an operating state ensuring the parallel travel mode. Once the vehicle stops, the clutch mode control unit 23 clears the flag to execute a clutch engagement authorization mode. In the clutch engagement authorization mode, the clutch control unit 12 can carry out clutch engagement again in order to switch the vehicle to the parallel travel mode while the vehicle is running in the series travel mode or the EV travel mode.

When clutch engagement is to be performed again, the rotational numbers of the respective engaging members are synchronized by the clutch rotation control unit 21 as mentioned above, whereafter clutch engagement is effected by the clutch engagement control unit 22.

The estimated time to be set by the clutch engagement control unit 22 is set by the map which the clutch engagement control unit 22 prestores, as stated above. Here, the clutch-nonengageable determination count (N+1) in the present control is larger by 1 than the clutch-nonengageable determination count (N) in the previous control. Thus, the estimated time in the present control is longer than the estimated time in the previous control. Since the activating time for the clutch becomes longer than that at the time of the previous clutch engagement determination, the oil temperature of the clutch rises. As a result of this temperature rise, when the engaging members can engage, the rotational numbers of the engaging members become equal. Based on this fact, the clutch engagement control unit 22 decides that the clutch has been engaged. Thus, the vehicle is switched to the parallel travel mode.

On the other hand, if the rotational numbers do not become equal, that is, if the engaging members cannot engage, the clutch engagement control unit 22 determines that the reengagement of the engaging members has failed. Based on this determination, the same process as described above is performed. As the clutch-nonengageable determination count is increased, the estimated time is lengthened by the clutch engagement control unit 22.

In the present embodiment, whether the engaging members of the clutch have been engaged or not is determined by the difference between the rotational numbers of the respective engaging members when a predetermined estimated time has elapsed (namely, when a predetermined connection time has elapsed) since the start of determination (i.e., since the start of movement of the engaging members). By making such a determination, it can be determined easily and accurately whether the clutch has been successfully engaged, even in the absence of a pressure sensor. By lengthening the estimated time in accordance with the clutch-nonengageable determination count, moreover, engagement of the engaging members of the clutch can be effected. That is, in case clutch engagement has been unsuccessful because of a low clutch oil temperature, rather than a failure, repeated retries raise the temperature of the oil, making it easy for the engaging members to be engaged. This can release the clutch from the nonengageable state due to temporary factors, such as a low clutch oil temperature, and the clutch becomes engageable. Thus, the vehicle can run in an appropriate travel mode adapted to a driver's requirement. It should be noted here that if a long estimated time is preset in this case, the response of the vehicle to the driver's requirement is affected. Lengthening of the estimated time according to the state of the clutch, therefore, allows a prompt response to the driver's requirement.

When the clutch-nonengageable determination count exceeds a predetermined value, the clutch control unit 12 determines that the clutch is failing.

Figure 3:
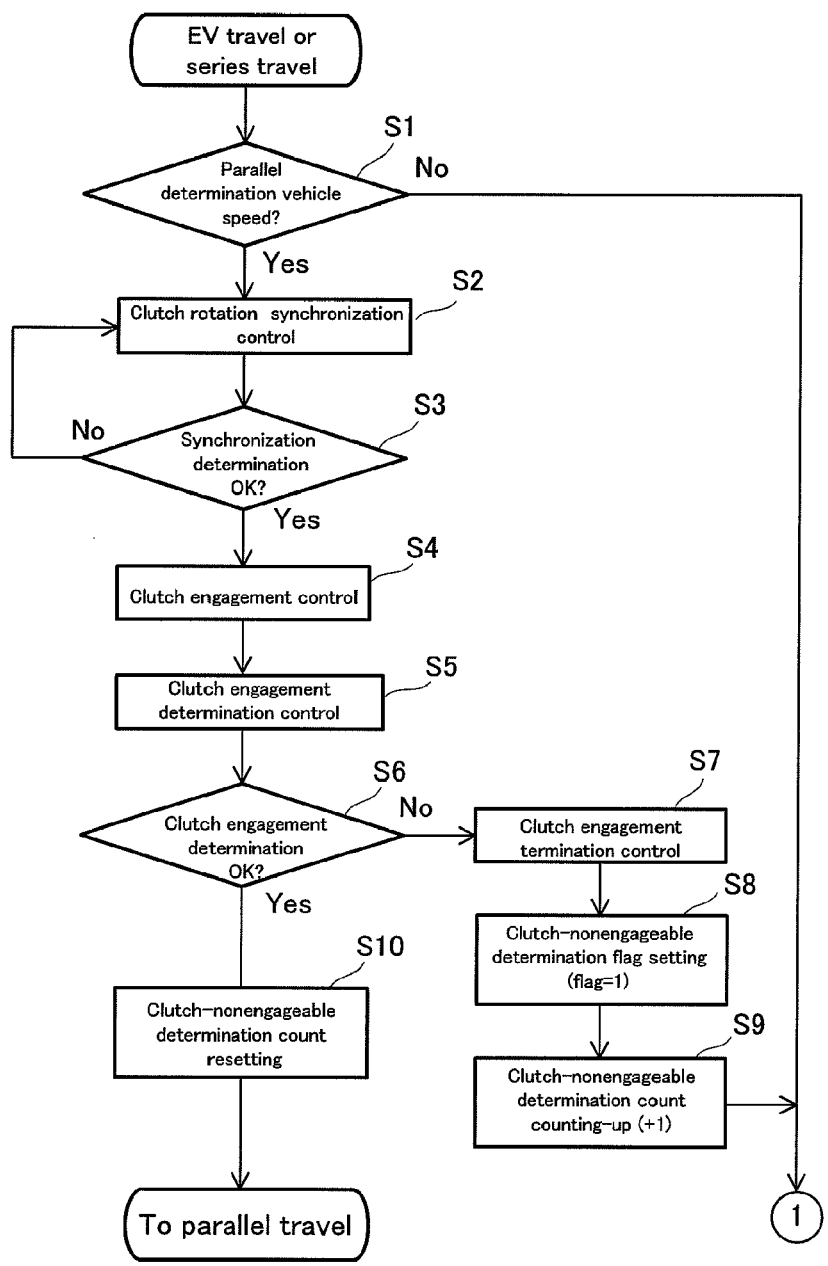
FIG. 3 is a view showing a flowchart of control according to Embodiment 1.
Figure 4:
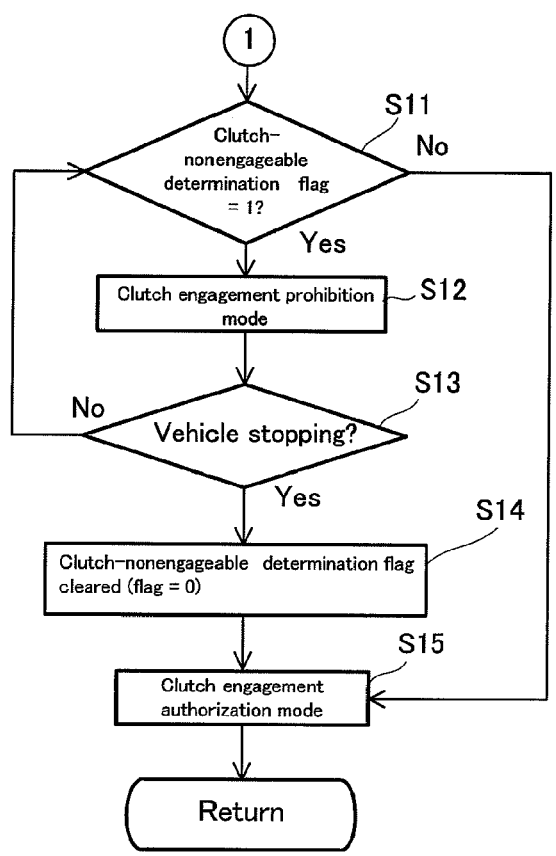
FIG. 4 is a view showing a flowchart of the control according to Embodiment 1.

The foregoing control by the clutch control unit will be described with reference to flowcharts shown in FIG. 3 and FIG. 4.

The clutch control unit exercises control as shown in the flowcharts when the aforementioned clutch engagement authorization mode is executed.

First, in step S1, the clutch control unit decides whether or not the vehicle speed required by the driver is higher than a parallel determination vehicle speed at which the series travel mode (or the EV travel mode) should be switched to the parallel travel mode. If the vehicle speed required by the driver is equal to or higher than the parallel determination vehicle speed (YES), the program proceeds to step S2. If the vehicle speed required by the driver is lower than the parallel determination vehicle speed (NO), the vehicle maintains the series travel mode (or the EV travel mode) as such.

In step S2, synchronization of the rotations of the engaging members of the clutch is started for a shift to the parallel travel mode. In this case, the rotation of the first engaging member (the engaging member on the engine side) is increased by the generator so as to be synchronized to the rotation of the second engaging member (the engaging member on the motor side).

In step S3, it is determined whether or not the rotations of the first engaging member and the second engaging member are synchronized to each other. If their rotational numbers are each within a predetermined range (YES), the program proceeds to step S4. If the rotational numbers are still outside the predetermined range (NO), the program returns to step S2.

In step S4, a clutch engagement instruction signal is inputted, whereupon the clutch engagement control unit starts control. That is, the clutch engagement control unit exerts a hydraulic pressure on the engaging members 80 to increase the pressure on the engaging members, thereby starting engagement. The program proceeds to step S5.

In step S5, the clutch engagement control unit 22 performs clutch engagement determination control. That is, the measurement of the estimated time is started. The program proceeds to step S6. Step S4 and step S5 may be executed simultaneously.

In step S6, the clutch engagement control unit 22 performs determination of the engagement of the engaging members. That is, whether or not the engaging members have been successfully engaged is determined according to whether or not the rotational numbers of the first engaging member and the second engaging member at a preset estimated time after start of engagement are within a predetermined value. If the rotational numbers after a lapse of the estimated time are within the predetermined value (YES), it is determined that engagement has been successful, and the vehicle maintains its state unchanged. The program proceeds to step S10.

In step S6, if the rotational numbers after a lapse of the estimated time are greater than the predetermined value (NO), the clutch engagement control unit 22 determines that the engaging members have not been engaged successfully. This is because the engaging members have been nonengageable, and the engagement of the clutch has not been accomplished, so that the clutch is in a partially engaged state, thereby producing a rotational number difference. The program proceeds to step S7.

In step S7, the clutch engagement control unit terminates the engagement control of the clutch to release the engaging members. The program proceeds to step S8.

In step S8, the clutch mode control unit sets a clutch-nonengageable determination flag. That is, the flag=1. The program proceeds to step S9.

In step S9, the clutch mode control unit counts up the clutch-nonengageable determination count (it is increased from N to N+1). Under these conditions, the vehicle is not switched to the parallel travel mode, but runs in the series travel mode (or the EV travel mode). The program proceeds to step S11.

In step S10, the counted-up clutch-nonengageable determination count is reset. The travel mode is shifted to the parallel travel mode.

The foregoing steps S1 to S10 deal with the control for shift from the series travel mode to the parallel travel mode. Steps S11 to S15 to be described below are concerned with control over the determination of the clutch engagement mode during travel.

In step S11, it is decided by the clutch mode control unit whether or not the clutch-nonengageable determination flag has been set, namely, whether or not the flag=1. If the flag=1 (YES), the program proceeds to step S12. If the flag is not 1 (NO), the program proceeds to step S15.

In step S12, the clutch mode control unit sets the clutch engagement prohibition mode. The program proceeds to step 513.

In step S13, the clutch mode control unit determines whether the vehicle is stationary or not. If the vehicle is stationary (YES), the program proceeds to step S14. When the vehicle is not stationary (NO), the program returns to step S11. That is, the clutch engagement prohibition mode continues until the vehicle stops.

In step S14, when the vehicle stops, the clutch-nonengageable determination flag is released. The program proceeds to step S15.

In step S15, the clutch mode control unit sets the clutch engagement authorization mode. By this processing, the vehicle enters the clutch engagement authorization mode. Hence, if, in the series travel mode (or the EV travel mode), the vehicle speed required by the driver is higher than the parallel determination vehicle speed, the travel mode should be switched from the series travel mode (or the EV travel mode) to the parallel travel mode, thereby the clutch can be engaged.

That is, when the clutch mode control unit sets the clutch engagement prohibition mode, the clutch control unit does not engage the clutch until the vehicle becomes stationary. When the clutch mode control unit sets the clutch engagement authorization mode again after the vehicle stops, the clutch control unit performs engagement of the clutch. In this case, the estimated time in the determination of engagement of the clutch is rendered longer than that of the previous estimation, whereby the clutch is made easier to engage.

In the present embodiment, as described above, the clutch control unit exercises the engagement control of the clutch in accordance with the above-mentioned flowcharts. In this control, whether the engaging members of the clutch have been engaged or not is determined by the difference between the rotational numbers of the respective engaging members when a predetermined estimated time has elapsed (namely, when a predetermined connection time has elapsed) since the start of determination (i.e., since the start of movement of the engaging members). By making such a determination, it can be determined easily and accurately whether the clutch has been successfully engaged, even in the absence of a pressure sensor. Moreover, by lengthening the estimated time in accordance with the clutch-nonengageable determination count, engagement of the engaging members of the clutch can be effected. That is, in case clutch engagement has been unsuccessful because of a low clutch oil temperature, rather than a failure, repeated retries raise the temperature of the oil, making it easy for the engaging members to be engaged. This can release a clutch-nonengageable state due to a temporary factor, such as a low clutch oil temperature, and the clutch becomes engageable. Thus, the vehicle can run in an appropriate travel mode adapted to the driver's requirement. It should be noted here that if a long estimated time is preset in this case, the response of the vehicle to the driver's requirement is lowered. Lengthening of the estimated time according to the state of the clutch, therefore, allows a prompt response to the driver's requirement.

The control by the clutch control unit will be described in more detail by time charts in FIGS. 5 and 6.

First, the success of clutch engagement will be described with reference to FIG. 5.

During a series travel at t=t0 to t1 (except t1), the clutch is in a disengaged state. At t=t0, no clutch engagement instruction signal is inputted, and the clutch pressure is also zero. Since the clutch is not provided with a pressure sensor in the present embodiment, the clutch pressure is based on estimation. At this time, the torque of the engine is great, while the torque of the generator is negative. As noted from these facts, the power of the engine is used for electric generation. As for the rotational number, the vehicle is in the series travel mode and runs by the motor. Thus, the rotational number of the motor (Nm) is high, whereas the rotational number of the engine (Ne) generating electricity is low.

At t=t1, the speed required of the vehicle becomes equal to or higher than a parallel travel speed, and control by the clutch control unit begins.

At t=t1 to t2 (except t2), the rotational number of the engine is increased by the clutch rotational number control unit to be synchronized to the rotational number of the motor.

At t=t2, the rotational number of the engine is synchronized to the rotational number of the motor, and the clutch rotational number control unit determines that the rotational numbers have been synchronized. Thus, a clutch engagement instruction signal is inputted to the clutch engagement control unit by t=t3.

Upon entry of the clutch engagement instruction signal into the clutch engagement control unit at t=t3, clutch engagement control by the clutch engagement control unit is started and, at the same time, the estimated time begins to be measured. When clutch engagement control is begun, the clutch pressure begins to rise, and the first engaging member and the second engaging member move in the axial direction. At t=t4, the engaging members contact to begin engagement of the clutch. From this time onward, pressure on the clutch increases further.

At t=t5, the vehicle switches the source of driving force from the motor to the engine, so that reversal between the torque of the motor and the torque of the engine is begun.

At t=t6, the torque of the motor and the torque of the engine take constant values, with their torques being reversed. This state continues until t=t7. During the process from t=t5 to t=t7 (except t7), the rotational numbers of the motor and the engine are the same.

At t=t7, assuming that the predetermined estimated time has elapsed, the clutch engagement control unit compares the rotational number of the motor and the rotational number of the engine that have been detected. Since their values are within the predetermined value, the clutch engagement control unit determines that the engaging members have been engaged. Thus, the vehicle is shifted substantially to the parallel travel mode.

When the power source is switched to the engine in the case of the above-mentioned success in the engagement of the clutch, the rotation by the engine and the rotation by the motor are synchronized. Thus, no slip in engine rotation occurs. Hence, the rotational numbers at the estimated time are nearly the same, and are included within the predetermined range.

Next, a failure in the engagement of the clutch will be described with reference to FIG. 6.

The procedure during the process at t=t0 to t=t3 (except t3) is the same as that for the above-mentioned success in clutch engagement, and thus is omitted.

At t=t3, clutch engagement control by the clutch engagement control unit is started and, at the same time, the estimated time begins to be measured. When clutch engagement control is begun, the clutch pressure begins to rise, and the respective engaging members move in the axial direction, whereby clutch is engaged.

Figure 5:
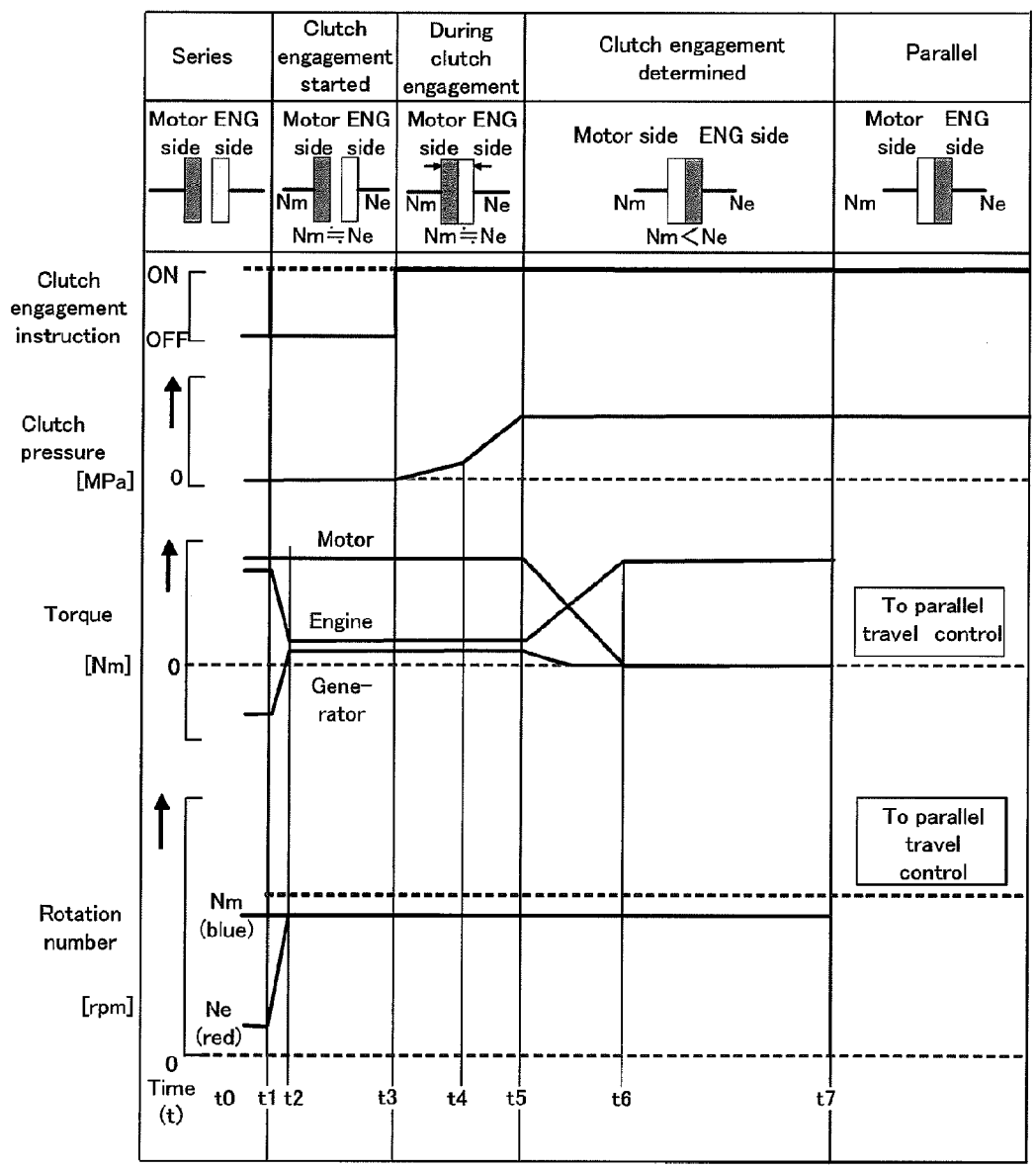
FIG. 5 is a view showing a timing chart when engagement in the control according to Embodiment 1 was successful.
Figure 6:
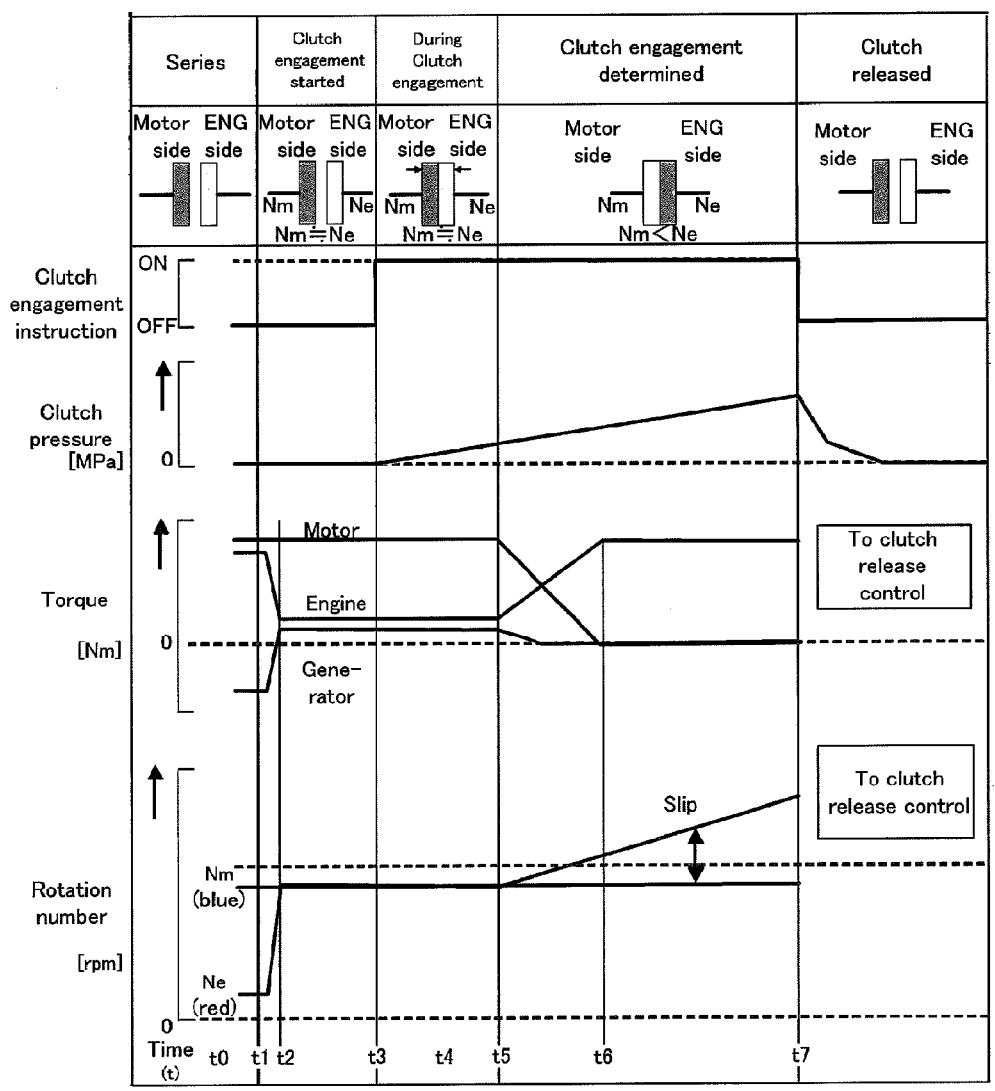
FIG. 6 is a view showing a timing chart when engagement in the control according to Embodiment 1 failed.

From t=t3 until t=t5 (except t5), the clutch pressure gradually rises as in the initial stage, unlike the case shown in FIG. 5, because the engaging members remain disengaged.

At t=t5, the drive source is switched to the engine. Since clutch engagement has not been accomplished, however, a partially engaged state is caused, and a slip in the rotational number on the engine side begins to occur.

At t=t6, the torque of the motor and the torque of the engine take constant values, with their torques being reversed. However, the difference between the rotational numbers grows gradually and increasingly over time. At t=t5 to t=t6 as well, the clutch pressure only rises gradually.

At t=t7, assuming that the predetermined estimated time has elapsed, the clutch engagement control unit compares the rotational number of the motor and the rotational number of the engine that have been detected. Since their values are equal to or more than the predetermined value, the clutch engagement control unit determines that the engaging members have not been engaged completely. Thus, the clutch engagement instruction signal is turned off, and the clutch pressure is released.

In the case of the above-mentioned failure in the engagement of the clutch, when the power source is switched to the engine, the rotation of the engine undergoes a slip. As a result, the difference between the rotational number of the engine and the rotational number of the motor at the estimated time is so great that the difference between the rotational numbers is not within the predetermined range. Thus, it is determined that the engaging members have not been engaged.

When it is determined next time whether clutch engagement has been successful or not, the estimated time for this determination is rendered longer than a time from t=t3 until t=t7, and a longer time is taken for clutch engagement. By so doing, the engaging members of the clutch are made easier to engage, whereby the clutch is brought into engagement.

In the present embodiment, as described above, whether or not the engaging members of the clutch have been engaged by control exercised by the clutch control unit can be determined easily and accurately even in the absence of a pressure sensor.

Embodiment 2

A second embodiment of the present invention will be described using FIG. 7. In the present embodiment, the clutch engagement control unit also considers the clutch oil temperature in setting the estimated time. This is a difference from the first embodiment.

In the present embodiment, the clutch engagement control unit compares an estimated time based on the oil temperature of the clutch (a second set time) with an estimated time based on the clutch-nonengageable determination count (a first set time), and sets the second set time or the first set time, whichever is longer, as the estimated time. Alternatively, the estimated time based on the oil temperature of the clutch and the estimated time based on the clutch-nonengageable determination count may be multiplied by their coefficients to set the estimated time. The clutch engagement control unit detects the oil temperature of the clutch, and acquires it. As shown in FIG. 7, the estimated time versus the oil temperature of the clutch is such that the higher the oil temperature of the clutch, the shorter the estimated time becomes. That is, as the oil temperature of the clutch rises, the viscosity of the oil lowers, and the engaging members become easier to engage. Thus, the estimated time to be taken for determination of whether engagement has been successful or unsuccessful can be shortened.

Figure 7:
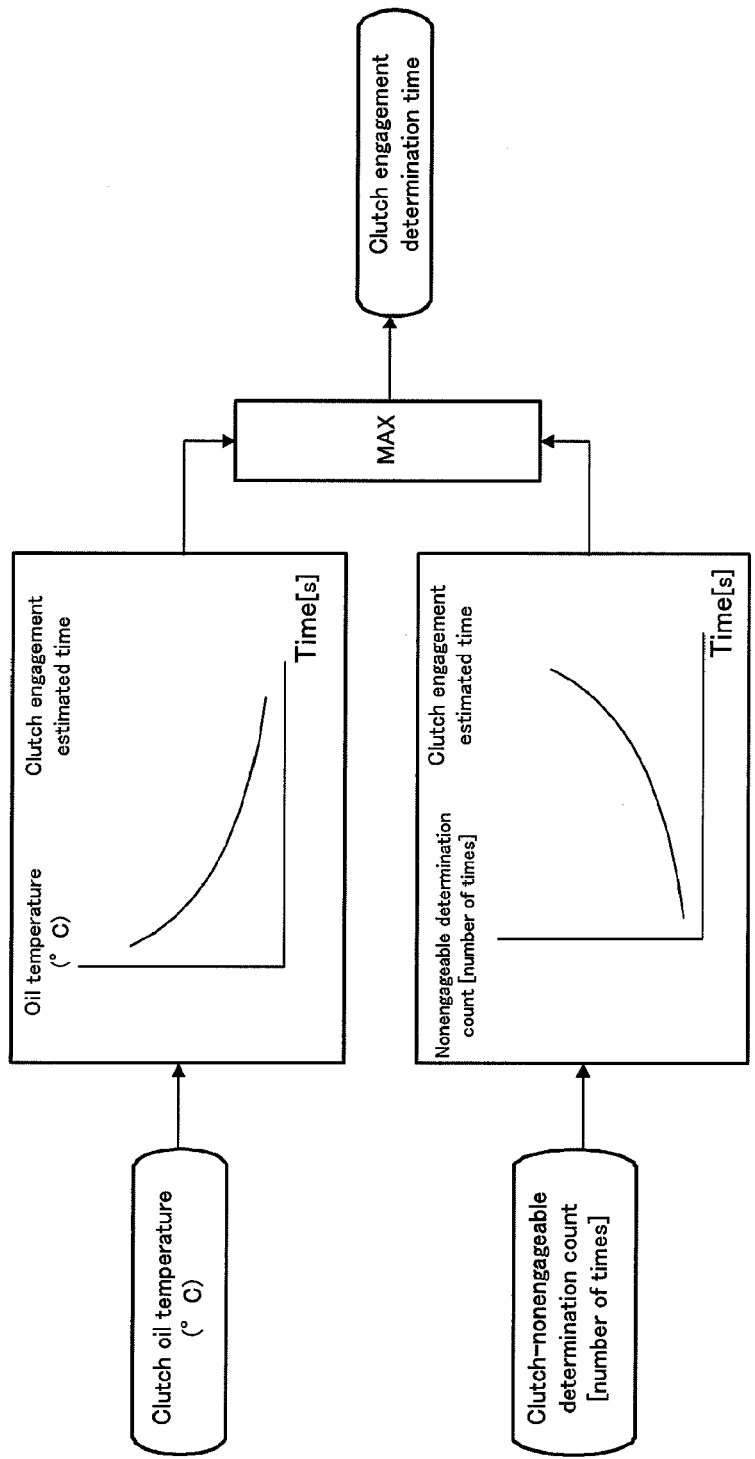
FIG. 7 is a view for illustrating control according to Embodiment 2.

On the other hand, the clutch-nonengageable determination count and the estimated time are in such a relation that as the clutch-nonengageable determination count increases, the estimated time lengthens, as shown in FIG. 7. That is, the higher the clutch-nonengageable determination count, the more difficultly the clutch has engaging. Thus, the estimated time is rendered longer to make clutch engagement easier.

The clutch engagement control unit acquires the estimated time with respect to the oil temperature of the clutch and the estimated time with respect to the clutch-nonengageable determination count, compares both estimated times, and sets the longer of the estimated times as the estimated time. In line with this procedure, since the estimated time based on the oil temperature is initially longer than the estimated time based on the clutch-nonengageable determination count, the estimated time based on the oil temperature is set as the estimated time. Then, the estimated time based on the clutch-nonengageable determination count is longer than the estimated time based on the oil temperature, and is thus set as the estimated time.

As described above, both estimated times are compared, and the longer estimated time is preferentially set as the estimated time. Because of this feature, in the present embodiment, determination by the clutch engagement control unit can be made more reliably and more accurately, and the clutch can be engaged more easily with a single determination. That is, the predetermined time can be set more appropriately depending on the state of the clutch.

The embodiments of the present invention are not limited to the ones described above. In the above-mentioned embodiments, for example, switching from the series travel mode to the parallel travel mode has been explained, but this is not limitative. For switching from the EV travel mode to the parallel travel mode, the same embodiments hold true. According to the present embodiment, moreover, the vehicle runs, with only the engine as the drive source, in the parallel travel mode, but this is not limitative. The vehicle may run, with both the engine and the motor serving as the drive source.

The embodiments have been explained in connection with the clutch being the hydraulic clutch, but this is not limiting. Even an electromagnetic clutch can be controlled in the same manner.

INDUSTRIAL APPLICABILITY

The clutch control device of a hybrid vehicle according to the present invention can be used in a hybrid vehicle. Hence, it is applicable in the automobile manufacturing industry.

EXPLANATIONS OF LETTERS OR NUMERALS

1 Vehicle
2 Power transmission mechanism
3 Wheel
4 Motor
5 High voltage battery
6 Engine
7 Output system
8 Clutch
9 Generator
10 Inverter
11 Control unit
12 Clutch control unit (determination means)
21 Clutch rotation control unit
22 Clutch engagement control unit
23 Clutch mode control unit
31 Vehicle speed detection unit
32 Motor rotational number detection unit
33 Engine rotational number detection unit
80 Engaging members
81 First Engaging member (first clutch plate)
82 Second engaging member (second clutch plate)

The invention claimed is:

1. A clutch control device for exercising disengagement and engagement control of a clutch in a hybrid vehicle, the hybrid vehicle having formed therein a driving force transmission path for transmitting a driving force from an engine to driving wheels via the clutch, and a rotating force transmission path in which an electric motor is connected between the clutch and the driving wheels to transmit a rotating force of the electric motor to the driving wheels, wherein
the clutch comprises
a first clutch plate to which the driving force from the engine is inputted, and
a second clutch plate engaging the first clutch plate to form the driving force transmission path,
the second clutch plate is configured to be synchronized with rotation of the electric motor, and
the clutch control device has determination means which determines that engagement of the clutch has been accomplished, on condition that a difference between rotational numbers of the first clutch plate and the second clutch plate at a predetermined engaging time after start of the engagement of the clutch is equal to or smaller than a predetermined value, when the clutch control device performs the disengagement and engagement control of the clutch so as to switch from a first travel mode, in which the vehicle runs by use of the rotating force transmission path alone, to a second travel mode using the driving force transmission path.

2. The clutch control device according to claim 1, wherein when the clutch control device determines that the engagement of the clutch has not been accomplished, the clutch control device starts engagement of the clutch repeatedly, and corrects the predetermined engaging time according to a count of how many times it has been determined that the engagement of the clutch was not accomplished, or according to an oil temperature of the clutch.

3. The clutch control device according to claim 2, wherein the higher the count of how many times it has been determined that the engagement of the clutch was not accomplished, the longer the predetermined engaging time becomes.

4. The clutch control device according to claim 2, wherein the higher the oil temperature of the clutch, the longer the predetermined engaging time becomes.

5. The clutch control device according to claim 2, wherein the clutch control device takes, as the predetermined engaging time, a first time set based on the count of how many times it has been determined that the engagement of the clutch was not accomplished, or a second time set based on the oil temperature of the clutch, whichever is longer.

* * * * *